United States Patent
Tsuge et al.

(10) Patent No.: US 10,784,525 B2
(45) Date of Patent: *Sep. 22, 2020

(54) METHOD OF INSPECTING OUTPUT OF FUEL CELL

(71) Applicant: HONDA MOTOR CO., LTD., Minato-ku, Tokyo (JP)

(72) Inventors: Hodaka Tsuge, Tochigi-ken (JP); Takashi Kato, Tochigi-ken (JP); Tadaaki Yamada, Tochigi-ken (JP); Ayumi Mizuno, Tochigi-ken (JP); You Shimomura, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/140,755

(22) Filed: Sep. 25, 2018

(65) Prior Publication Data
US 2019/0103618 A1    Apr. 4, 2019

(30) Foreign Application Priority Data
Sep. 29, 2017 (JP) .................... 2017-192043

(51) Int. Cl.
| | | |
|---|---|---|
| H01M 8/04537 | (2016.01) |
| H01M 8/04664 | (2016.01) |
| H01M 4/92 | (2006.01) |
| H01M 8/04858 | (2016.01) |
| H01M 8/1004 | (2016.01) |
| H01M 8/1018 | (2016.01) |

(52) U.S. Cl.
CPC ....... *H01M 8/04619* (2013.01); *H01M 4/926* (2013.01); *H01M 8/0488* (2013.01); *H01M 8/0491* (2013.01); *H01M 8/04679* (2013.01); *H01M 8/1004* (2013.01); *H01M 2008/1095* (2013.01)

(58) Field of Classification Search
CPC .................. H01M 8/04619; H01M 8/04552
See application file for complete search history.

(56) References Cited

U.S. PATENT DOCUMENTS

2016/0172694 A1    6/2016 Norimoto

FOREIGN PATENT DOCUMENTS

| | | |
|---|---|---|
| EP | 2515369 | 10/2012 |
| JP | 2011-028965 | 2/2011 |
| JP | 2014-232672 | 12/2014 |

OTHER PUBLICATIONS

Extended European Search Report for European Patent Application No. 18197217.5 dated Feb. 26, 2019.

*Primary Examiner* — Matthew J Merkling
(74) *Attorney, Agent, or Firm* — Amin, Turocy & Watson, LLP

(57) ABSTRACT

In a method of inspecting output of a fuel cell, a reduction step is performed, and thereafter, a measurement step is performed. In the reduction step, reduction treatment is applied to electrode catalyst contained in an anode and a cathode. After the reduction treatment is applied to the electrode catalyst of the anode and the cathode, in the measurement step, measurement current which is smaller than rated current of the fuel cell, is applied to the anode and the cathode to inspect the output of the fuel cell.

3 Claims, 10 Drawing Sheets

FIG. 2

| NUMBER OF TIMES | EMBODIMENT EXAMPLE | | | | | COMPARATIVE EXAMPLE 1 (NO REDUCTION STEP) |
|---|---|---|---|---|---|---|
| | 1-1 (NUMBER OF CYCLES IS 1) | 1-2 (NUMBER OF CYCLES IS 2) | 1-3 (NUMBER OF CYCLES IS 3) | 1-4 (NUMBER OF CYCLES IS 4) | 1-5 (NUMBER OF CYCLES IS 5) | |
| 1 | 0.9998 | 1.0032 | 1.0061 | 1.0010 | 1.0031 | 0.9934 |
| 2 | 1.0046 | 0.9997 | 0.9979 | 1.0051 | 1.0034 | 0.9937 |
| 3 | 1.0068 | 1.0019 | 1.0014 | 0.9981 | 1.0005 | 0.9866 |
| 4 | 0.9922 | 0.9988 | 1.0021 | 0.9987 | 0.9978 | 1.0068 |
| 5 | 0.9990 | 0.9959 | 1.0002 | 1.0002 | 1.0005 | 1.0260 |
| 6 | 0.9998 | 1.0037 | 0.9994 | 1.0018 | 1.0004 | 0.9977 |
| 7 | 1.0072 | 1.0016 | 0.9963 | 0.9965 | 0.9990 | 0.9926 |
| 8 | 0.9920 | 0.9958 | 1.0009 | 0.9985 | 0.9998 | 1.0003 |
| 9 | 1.0027 | 0.9993 | 1.0005 | 0.9971 | 0.9961 | 0.9964 |
| 10 | 0.9959 | 1.0000 | 0.9953 | 1.0032 | 0.9995 | 1.0065 |
| STANDARD DEVIATION | 0.005470 | 0.002720 | 0.003077 | 0.002764 | 0.002190 | 0.011057 |
| AVERAGE | 1.00000 | 0.99999 | 1.00001 | 1.00002 | 1.00001 | 1.00000 |

FIG. 4

| NUMBER OF TIMES | EMBODIMENT EXAMPLE | | | | | COMPARATIVE EXAMPLE 2 (NO REDUCTION STEP) |
|---|---|---|---|---|---|---|
| | 2-1 (NUMBER OF CYCLES IS 1) | 2-2 (NUMBER OF CYCLES IS 2) | 2-3 (NUMBER OF CYCLES IS 3) | 2-4 (NUMBER OF CYCLES IS 4) | 2-5 (NUMBER OF CYCLES IS 5) | |
| 1 | 0.9997 | 0.9974 | 1.0007 | 1.0027 | 1.0006 | 0.9963 |
| 2 | 0.9968 | 0.9987 | 1.0040 | 1.0047 | 1.0013 | 1.0048 |
| 3 | 1.0029 | 1.0015 | 1.0049 | 0.9970 | 1.0013 | 0.9865 |
| 4 | 1.0005 | 1.0009 | 0.9988 | 1.0030 | 1.0010 | 0.9989 |
| 5 | 0.9981 | 1.0034 | 0.9996 | 0.9982 | 1.0022 | 1.0114 |
| 6 | 0.9964 | 1.0003 | 1.0038 | 1.0018 | 0.9999 | 0.9941 |
| 7 | 1.0040 | 1.0002 | 0.9976 | 1.0021 | 0.9983 | 1.0016 |
| 8 | 1.0052 | 1.0040 | 0.9960 | 0.9962 | 0.9995 | 1.0022 |
| 9 | 0.9953 | 0.9993 | 0.9992 | 0.9960 | 0.9965 | 1.0054 |
| 10 | 1.0011 | 0.9943 | 0.9953 | 0.9984 | 0.9994 | 0.9988 |
| STANDARD DEVIATION | 0.003365 | 0.002832 | 0.003350 | 0.003184 | 0.001678 | 0.006855 |
| AVERAGE | 1.00000 | 1.00000 | 0.99999 | 1.00001 | 1.00000 | 1.00000 |

FIG. 6

| NUMBER OF TIMES | EMBODIMENT EXAMPLE | | | | COMPARATIVE EXAMPLE 1 |
|---|---|---|---|---|---|
| | 1-2 (0.08~1.00V) | 3-1 (0.08~0.50V) | 3-2 (0.50~1.00V) | 3-3 (0.85~1.00V) | |
| 1 | 1.0032 | 1.0057 | 1.0031 | 1.0066 | 0.9934 |
| 2 | 0.9997 | 1.0027 | 1.0075 | 1.0095 | 0.9937 |
| 3 | 1.0019 | 1.0015 | 1.0012 | 1.0030 | 0.9866 |
| 4 | 0.9988 | 1.0022 | 0.9993 | 1.0059 | 1.0068 |
| 5 | 0.9959 | 0.9984 | 1.0043 | 0.9995 | 1.0260 |
| 6 | 1.0037 | 1.0026 | 0.9988 | 0.9979 | 0.9977 |
| 7 | 1.0016 | 0.9964 | 0.9977 | 0.9985 | 0.9926 |
| 8 | 0.9958 | 0.9975 | 0.9954 | 0.9952 | 1.0003 |
| 9 | 0.9993 | 0.9950 | 0.9983 | 0.9926 | 0.9964 |
| 10 | 1.0000 | 0.9981 | 0.9943 | 0.9915 | 1.0065 |
| STANDARD DEVIATION | 0.002720 | 0.003399 | 0.004076 | 0.006097 | 0.011057 |
| AVERAGE | 0.99999 | 1.00001 | 0.99999 | 1.00002 | 1.00000 |

FIG. 8

| NUMBER OF TIMES | EMBODIMENT EXAMPLE | | | | COMPARATIVE EXAMPLE 2 |
|---|---|---|---|---|---|
| | 2-2 (0.08~1.00V) | 4-1 (0.08~0.50V) | 4-2 (0.50~1.00V) | 4-3 (0.85~1.00V) | |
| 1 | 0.9974 | 1.0047 | 1.0066 | 1.0043 | 0.9963 |
| 2 | 0.9987 | 0.9999 | 1.0021 | 0.9986 | 1.0048 |
| 3 | 1.0015 | 0.9989 | 1.0036 | 1.0099 | 0.9865 |
| 4 | 1.0009 | 1.0042 | 1.0032 | 0.9949 | 0.9989 |
| 5 | 1.0034 | 1.0007 | 0.9986 | 1.0057 | 1.0114 |
| 6 | 1.0003 | 1.0021 | 1.0023 | 1.0001 | 0.9941 |
| 7 | 1.0002 | 1.0001 | 0.9963 | 0.9985 | 1.0016 |
| 8 | 1.0040 | 0.9995 | 0.9972 | 1.0041 | 1.0022 |
| 9 | 0.9993 | 0.9943 | 0.9958 | 0.9985 | 1.0054 |
| 10 | 0.9943 | 0.9956 | 0.9943 | 0.9853 | 0.9988 |
| STANDARD DEVIATION | 0.002832 | 0.003299 | 0.004084 | 0.006785 | 0.006855 |
| AVERAGE | 1.00000 | 1.00000 | 1.00000 | 0.99999 | 1.00000 |

FIG. 10

| NUMBER OF TIMES | EMBODIMENT EXAMPLE 1-2 (REDUCTION STEP + MEASUREMENT STEP) | EMBODIMENT EXAMPLE 5 (OXIDATION STEP + REDUCTION STEP + MEASUREMENT STEP) |
|---|---|---|
| 1 | 1.0032 | 1.0007 |
| 2 | 0.9997 | 0.9970 |
| 3 | 1.0019 | 1.0014 |
| 4 | 0.9988 | 0.9996 |
| 5 | 0.9959 | 0.9967 |
| 6 | 1.0037 | 1.0023 |
| 7 | 1.0016 | 1.0016 |
| 8 | 0.9958 | 1.0013 |
| 9 | 0.9993 | 0.9998 |
| 10 | 1.0000 | 0.9999 |
| STANDARD DEVIATION | 0.002720 | 0.001888 |
| AVERAGE | 0.99999 | 1.00003 |

METHOD OF INSPECTING OUTPUT OF FUEL CELL

CROSS-REFERENCE TO RELATED APPLICATION

This application is based upon and claims the benefit of priority from Japanese Patent Application No. 2017-192043 filed on Sep. 29, 2017, the contents of which are incorporated herein by reference.

BACKGROUND OF THE INVENTION

Field of the Invention

The present invention relates to a method of inspecting output of a fuel cell. The fuel cell includes an electrolyte membrane of solid polymer, an anode provided on one surface of the electrolyte membrane, and a cathode provided on the other surface of the electrolyte membrane.

Description of the Related Art

Fuel cells having an anode on one surface of an electrolyte membrane of solid polymer, and a cathode on the other surface of the electrolyte membrane are known. As a method of inspecting output of a fuel cell of this type, for example, Japanese Laid-Open Patent Publication No. 2011-028965 proposes to apply energizing current which is equal to rated current in actual power generation between the anode and the cathode, and based on whether or not the obtained output is not less than a reference value, determine the presence/absence of abnormality.

SUMMARY OF THE INVENTION

In the above output inspection method, an apparatus in large scale or large quantities of the fuel gas and the oxygen-containing gas are required for applying large energizing current which is equal to the rated current, between the electrodes. Therefore, large cost is required for output inspection.

However, if energizing current which is smaller than rated current is simply applied between the electrodes at time of output inspection in order to reduce the cost required for output inspection, variation in results of output inspection tends to occur easily, and the desired accuracy of the output inspection may not be achieved.

A main object of the present invention is to provide a method of inspecting output of a fuel cell in which it is possible to measure output of the fuel cell at low cost and highly accurately.

In the case where small energizing current is applied between the electrodes at the time of output inspection, the desired accuracy of output inspection may not be achieved. With regard to the cause of this point, as a result of intensive studies of the inventors of the present application, the following findings have been obtained. Specifically, if large energizing current equal to the rated current is applied between the electrodes, it is possible to decrease the voltage applied between the electrodes to be significantly lower than the reduction potential of the electrode catalyst. For this reason, even if variation is present in the oxidation reduction state of the electrode catalyst before measurement of output of the fuel cell, by applying the large energizing current between the electrodes afterward, so as to measure the output of the fuel cell, it is possible to suppress or eliminate variation of the oxidation state. As a result, it is possible to suppress variation in measurement results of output of the fuel cell due to the influence of the oxidation reduction state of the electrode catalyst.

On the other hand, if small energizing current is applied between the electrode, since the voltage applied between the electrodes becomes large, in the case where variation is present in the oxidation reduction state of the electrode catalyst before measurement of output of the fuel cell, it follows that output inspection is performed in the presence of variation in the oxidation reduction state. As a result, variation tends to occur easily in the measurement results of the output of the fuel cell as well, due to the influence of variation in the oxidation reduction state of the electrode catalyst. Therefore, the desired accuracy of output inspection may not be achieved.

In view of the above, according to an embodiment of the present invention, a method of inspecting output of a fuel cell is provided. The fuel cell includes an electrolyte membrane of solid polymer, an anode provided on one surface of the electrolyte membrane, and a cathode provided on another surface of the electrolyte membrane. The method includes a reduction step of applying reduction treatment to electrode catalyst contained in the anode and the cathode, and a measurement step of measuring output of the fuel cell after the reduction treatment is applied to the electrode catalyst, by applying measurement current which is smaller than rated current of the fuel cell, to the anode and the cathode.

In the method of inspecting output of the fuel cell, the reduction process is performed before the measurement step to apply reduction treatment to the electrode catalyst contained in the anode and the cathode. In this manner, it is possible to perform the measurement step after variation in the oxidation reduction state of the electrode catalyst has been suppressed or eliminated.

In the measurement step, measurement current which is smaller than rated current of the fuel cell is applied as energizing current between the anode and the cathode. Therefore, it is not required to provide an apparatus in large scale or large quantities of the fuel gas, etc. for applying large energizing current which is as large as the rated current. For this reason, with the simple structure, it is possible to perform output inspection of the fuel cell at low cost.

Further, at the time of performing the measurement step, as described above, variation in the oxidation reduction state of the electrode catalyst has been suppressed or eliminated by the reduction step. Therefore, in the measurement step, by applying small energizing current between the anode and the cathode, even in the case where the voltage applied between the anode and the cathode does not become small enough to suppress or eliminate variation in the oxidation reduction state of the electrode catalyst, it is possible to suppress variation in the measurement results of the output of the fuel cell. Consequently, it becomes possible to obtain the measurement results of the output of the fuel cell highly accurately.

In the method of inspecting output of the fuel cell, preferably, in the reduction step, while a fuel gas is supplied to the anode and an inert gas is supplied to the cathode, cyclic voltage may be applied to the fuel cell, the cyclic voltage being increased and decreased within a predetermined range having the minimum voltage less than a reduction potential of the electrode catalyst. In this case, in the reduction step, it becomes possible to reduce the electrode catalyst easily and effectively to suppress or eliminate variation in the oxidation reduction state of the electrode catalyst.

Preferably, the method of inspecting output of the fuel cell may further include an oxidation step of applying oxidation treatment to the electrode catalyst before the reduction step. In this manner, by performing the reduction step after the oxidation step, it is possible to perform the measurement step after variation in the oxidation reduction state of the electrode catalyst has been suppressed or eliminated. Therefore, it becomes possible to perform output inspection of the stack accurately to a greater extent.

In the method of inspecting output of the fuel cell, preferably, in the oxidation step, a fuel gas may be supplied to the anode and an oxygen-containing gas may be supplied to the cathode to regulate the voltage applied between the anode and the cathode to be not less than a reduction potential of the electrode catalyst. In this case, in the oxidation step, it is possible to easily and effectively oxidize the electrode catalyst. Therefore, by performing the reduction step after the oxidation step, it is possible to suppress or eliminate variation in the oxidation reduction state of the electrode catalyst effectively to a greater extent. Consequently, it becomes possible to achieve further improvement in the accuracy of measuring the output of the fuel cell.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a table showing the ratio values relative to the average value, the standard deviation, and the average value of the ratio values of measurement results of 10 outputs in each of embodiment examples 1-1 to 1-5 and a comparative example 1;

FIG. 4 is a table showing the ratio values relative to the average value, the standard deviation, and the average value of the ratio values of measurement results of 10 outputs in each of embodiment examples 2-1 to 2-5 and a comparative example 2;

FIG. 6 is a table showing the ratio values relative to the average value, the standard deviation, and the average value of the ratio values of measurement results of 10 outputs in each of embodiment examples 1-2, 3-1 to 3-3, and the comparative example 1;

FIG. 8 is a table showing the ratio values relative to the average value, the standard deviation, and the average value of the ratio values of measurement results of 10 outputs in each of embodiment examples 2-2, 4-1 to 4-3; and the comparative example 2;

FIG. 10 is a table showing the ratio values relative to the average value, the standard deviation, and the average value of the ratio values of measurement results of 10 outputs in each of embodiment examples 1-2 and 5.

DESCRIPTION OF THE PREFERRED EMBODIMENTS

Preferred embodiments of a method of inspecting output of a fuel cell according to the present invention will be described in detail with reference to the accompanying drawings.

Figure 1:
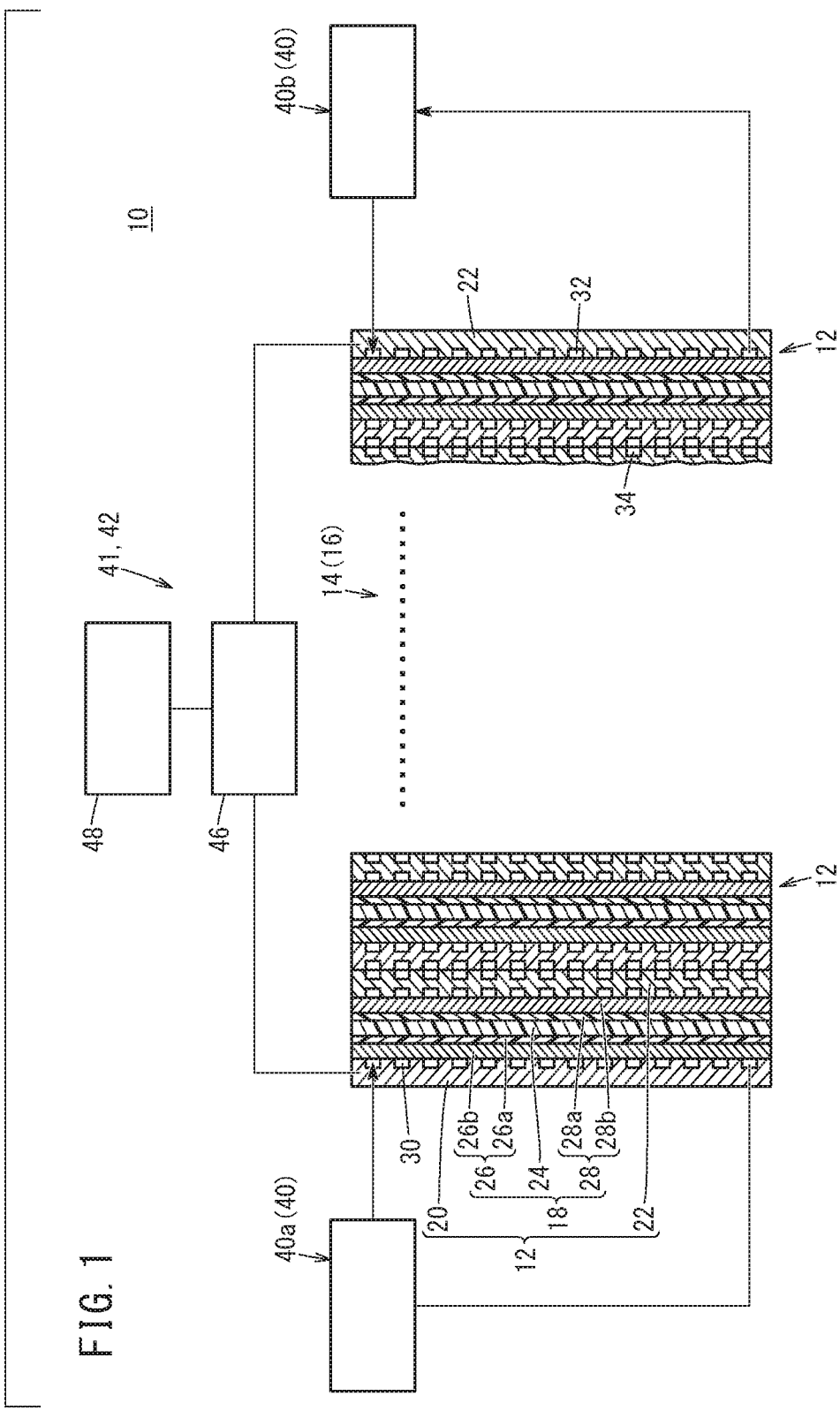
FIG. 1 is a diagram schematically showing structure of an output inspection apparatus for performing a method of inspecting output of a fuel cell according to an embodiment of the present invention.

The method of inspecting output of the fuel cell according to the embodiment of the present invention (hereinafter also simply referred to as the "output inspection method) can be performed using an output inspection apparatus 10 shown in FIG. 1. The output inspection apparatus 10 measures output of a fuel cell 16 in the form of a stack 14 formed by stacking a plurality of power generation cells 12 (unit fuel cells) together. The output inspection apparatus 10 can not only measure output of the fuel cell 16 in the form of the stack 14, but can also measure output of a fuel cell (not shown) in the form of a single power generation cell 12.

The power generation cell 12 is formed by sandwiching a membrane electrode assembly (MEA) 18 between a first separator 20 and a second separator 22. For example, the MEA 18 includes an electrolyte membrane 24, an anode 26 provided on one surface of the electrolyte membrane 24, and a cathode 28 provided on the other surface of the electrolyte membrane 24. The electrolyte membrane 24 is a thin membrane of polymer such as perfluorosulfonic acid.

The anode 26 is made of porous material including a first electrode catalyst layer 26a facing one surface of the electrolyte membrane 24, and a first gas diffusion layer 26b stacked on the first electrode catalyst layer 26a. The cathode 28 is made of porous material including a second electrode catalyst layer 28a facing the other surface of the electrolyte membrane 24, and a second gas diffusion layer 28b stacked on the second electrode catalyst layer 28a.

Each of the first electrode catalyst layer 26a and the second electrode catalyst layer 28a includes electrode catalyst supporting catalyst metal of platinum, etc. on a catalyst support of carbon such as carbon black, and an ion conductive polymer binder. It should be noted that the electrode catalyst may only comprise catalyst metal such as platinum black, and the electrode catalyst does not necessarily include the catalyst support.

In the case where the electrode catalyst comprises platinum, for example, the following electrode reaction occurs on the surface of the electrode catalyst:

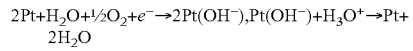

$$2Pt+H_2O+\tfrac{1}{2}O_2+e^- \rightarrow 2Pt(OH^-), Pt(OH^-)+H_3O^+ \rightarrow Pt+2H_2O$$

The reduction potential of this electrode catalyst is about 0.75 V.

For example, each of the first gas diffusion layer 26b and the second gas diffusion layer 28b is made of porous material of a carbon paper, carbon cloth, etc. The first gas diffusion layer 26b is placed to face the first separator 20, and the second gas diffusion layer 28b is placed to face the second separator 22. For example, carbon separators are used as the first separator 20 and the second separator 22. Alternatively, metal separators may be used as the first separator 20 and the second separator 22.

The first separator 20 has a fuel gas flow field 30 on its surface facing the first gas diffusion layer 26b. The fuel gas flow field 30 is connected to a fuel gas supply passage (not shown) for supplying a fuel gas such as a hydrogen-containing gas, and a fuel gas discharge passage (not shown) for discharging the fuel gas.

The second separator 22 has an oxygen-containing gas flow field 32 on its surface facing the second gas diffusion layer 28b. The oxygen-containing gas flow field 32 is connected to an oxygen-containing gas supply passage (not shown) for supplying an oxygen-containing gas, and connected to an oxygen-containing gas discharge passage (not shown) for discharging the oxygen-containing gas.

When a plurality of the power generation cells 12 are stacked together, a coolant flow field 34 is formed between a surface of the first separator 20 and a surface of the second separator 22 which face each other. The coolant flow field 34 is connected to a coolant supply passage (not shown) for supplying a coolant and a coolant discharge passage (not shown) for discharging the coolant.

Next, the output inspection apparatus 10 will be described below. The output inspection apparatus 10 includes a gas supply unit 40, an energizing unit 41, and a voltage application unit 42 as main components. The gas supply unit 40 includes a first supply unit 40a for supplying an anode gas to the anode 26 through the fuel gas flow field 30, and a second supply unit 40b for supplying a cathode gas to the cathode 28 through the oxygen-containing gas flow field 32. Examples of the anode gas include the above fuel gas. Examples of the cathode gas include an inert gas such as nitrogen, the above oxygen-containing gas, and a mixed gas of the inert gas and the oxygen-containing gas.

The first supply unit 40a can regulate the flow rate of the anode gas supplied to the anode 26, and mix water vapor with the anode gas to regulate the dew point of the anode gas. Likewise, the second supply unit 40b can regulate the flow rate of the cathode gas supplied to the cathode 28, and mix water vapor with the cathode gas to regulate the dew point of the cathode gas. The first supply unit 40a and the second supply unit 40b may circulate the anode gas and the cathode gas to/from the stack 14, or supply the anode gas and the cathode gas to the stack 14 to flow internally (hermetically inside the stack 14), or flow along the stack 14 and discharge them to use them only once.

In the state where the anode gas is supplied to the anode 26 by the first supply unit 40a and the cathode gas is supplied to the cathode 28 by the second supply unit 40b, the energizing unit 41 electrically connects the anode 26 and the cathode 28 for energization between both electrodes (the anode 26 and the cathode 28). In this regard, the energizing unit 41 can regulate the magnitude of the electrical current applied between the anode 26 and the cathode 28 (hereinafter also referred to as the energizing current).

The voltage application unit 42 applies cyclic voltage which is increased and decreased within a predetermined range, to the stack 14 through the first separator 20 provided at one end of the stack 14 in the stacking direction and the second separator 22 provided at the other end of the stack 14 in the stacking direction. That is, the voltage application unit 42 can change the applied voltage over time, and repeat the changes over time under control which is similar to that of potential sweep in the cyclic voltammetry scheme.

For example, the energizing unit 41 and the voltage application unit 42 can be made up of a potentiostat/galvanostat (P/G stat) 46 which is capable of implementing current control and potential control between the electrodes, and a sweeper 48, etc., capable of changing the preset current and the preset potential of the P/G stat 46 over time.

Hereinafter, the output inspection method according to the embodiment of the present invention using the output inspection apparatus 10 will be described below. First, after the stack 14 is assembled, the stack 14 is set to the output inspection apparatus 10. Specifically, the energizing unit 41 and the voltage application unit 42 (P/G stat 46) are electrically connected to the stack 14. The first supply unit 40a is connected to the fuel gas flow field 30, and the second supply unit 40b is connected to the oxygen-containing gas flow field 32.

Next, a reduction step of applying reduction treatment to electrode catalyst contained in the anode 26 and the cathode 28 is performed. In this reduction step, the first supply unit 40a supplies a fuel gas as the anode gas to the anode 26, and the second supply unit 40b supplies an inert gas as the cathode gas to the cathode 28.

In this regard, preferably, the gas supply unit 40 is operated to allow at least one of the anode gas and the cathode gas to contain water vapor so as to prevent the electrolyte membrane 24 from being dried, for example. In this case, the temperature of the stack 14 and the dew points of the gases are regulated in order to achieve the balance where both of flooding in the stack 14 and drying of the electrolyte membrane 24 are suppressed. Flooding herein means, for example, the presence of excessive water in the liquid state in the stack 14 to a degree where supply of the gases is obstructed by the excessive water.

Further, in the reduction step, as described above, while the gas supply unit 40 supplies the anode gas and the cathode gas, the voltage application unit 42 applies cyclic voltage which is increased and decreased within a predetermined range to the stack 14. The cyclic voltage has the minimum voltage which is less than the reduction voltage potential of the electrode catalyst. That is, the P/G stat 46 as the voltage application unit 42 implements potential control between the anode 26 and the cathode 28.

As described above, in the case where the electrode catalyst contains platinum, the reduction potential of the electrode catalyst is about 0.75 V. Therefore, the minimum value of the cyclic voltage applied by the voltage application unit 42 to the stack 14 is designed to be less than 0.75 V. In this regard, preferably, the voltage application unit 42 applies voltage in the range between 0.08 V and 1.00 V to the stack 14. By applying voltage of not less than 0.08 V, it becomes possible to repeatedly induce reactions where hydrogen is adsorbed on and desorbed from the electrode catalyst. Accordingly, it becomes possible to effectively induce a reduction reaction of the surface of the electrode catalyst to a greater extent. On the other hand, by applying voltage of not more than 1.00 V, even in the case where the electrode catalyst includes a carbon catalyst support, it becomes possible to avoid degradation of the catalyst support.

Further, in the case where the voltage applied to the stack 14 is increased from the minimum value to the maximum value and thereafter, decreased from the maximum value to the minimum value, and assuming that one cycle is made up of this operation, it is preferable to repeat this cycle one or more times, and more preferable to repeat this cycle two or more times. In this manner, it becomes possible to suitably apply reduction treatment to the electrode catalyst. By performing the reduction step in this manner, it is possible to suppress or eliminate variation in the oxidation reduction state of the electrode catalyst.

Next, a measurement step of measuring output of the stack 14 is performed. After the reduction treatment is applied to the electrode catalyst, measurement current is applied as energizing current to the anode 26 and the cathode 28. The measurement current is smaller than the rated current applied as energizing current at the time of actual power generation of the stack 14.

Specifically, in the measurement step, application of voltage by the voltage application unit 42 is stopped, and supply of the fuel gas by the first supply unit 40a is maintained. Further, the cathode gas supplied by the second supply unit 40b is changed from the inert gas to the oxygen-containing gas. In this manner, in the state where the power generation reactions are induced at the anode 26 and the cathode 28, the energizing unit 41 electrically connects, and energizes the anode 26 and the cathode 28.

That is, in the measurement step, as the energizing unit 41, the P/G stat 46 implements current control between the anode 26 and the cathode 28. In this regard, for example, in the case where the rated current of the stack 14 is 1.00 A/cm$^2$, measurement current at 0.02 A/cm$^2$ which is 1/50 of the rate current is used as the energizing current applied to the cathode 28 and the anode 26.

As described above, in the measurement step, the voltage is measured by applying the measurement current as energizing current which is smaller than the rated current, between the anode 26 and the cathode 28, and the voltage can be obtained as a result of measurement of the output of the stack 14. In this manner, it is not required to provide an apparatus in large scale or large quantities of the fuel gas, etc., for applying large energizing current which is as large as the rated current, to the anode 26 and the cathode 28. For this reason, with the simple structure, it becomes possible to perform output inspection of the stack 14 at low cost.

Further, in this output inspection method, as described above, by performing the reduction step before the measurement step, it is possible to perform the measurement step after variation in the oxidation reduction state of the electrode catalyst has been suppressed or eliminated. Therefore, in the measurement step, by applying small energizing current between the anode 26 and the cathode 28, even in the case where the voltage applied between the electrodes (the anode 26 and the cathode 28) does not become small enough to suppress or eliminate variation in the oxidation reduction state of the electrode catalyst, it is possible to suppress variation in measurement results of the output of the stack 14. Consequently, it becomes possible to perform output inspection of the stack 14 highly accurately.

As described above, in this output inspection method, it becomes possible to measure output of the stack 14 at low cost and highly accurately.

Based on the obtained measurement results of the output, in the case of inspecting the quality of the stack 14, for example, the following method can be adopted. Specifically, using the stack of the same model as the stack 14, the relationship between the output obtained when the rated current is applied as energizing current and the output when the measurement current is applied as the energizing current is determined beforehand. An output having a level suitable for making determination of good quality when the rated current is applied as energizing current, is determined as a reference value. Corresponding to the reference value, an output obtained when the measurement current is applied as energizing current is determined as a determination value, using the relationship. Then, by comparing the measurement result of the stack 14 obtained in the measurement step and the determination value, it is possible to inspect the assembled stack 14 to determine whether the assembled stack 14 has good quality or bad quality.

The present invention is not limited especially to the above described embodiment. Various modifications can be made without deviating from the gist of the present invention.

For example, in the embodiment, in the measurement step, the second supply unit 40b supplies the oxygen-containing gas to the cathode 28. Alternatively, the second supply unit 40b may supply a mixed gas of the oxygen-containing gas and the inert gas to the cathode 28. In this manner, by supplying the mixed gas to the cathode 28, the measuring result of the output of the stack 14 can be suppressed to have a value less than the reduction potential of the electrode catalyst.

In this manner, since it is possible to suppress oxidation of the electrode catalyst at the time of the measurement step, variation of the oxidation reduction state of the electrode catalyst is suppressed to a greater extent, and in this state, it is possible to obtain the measurement result of the output. Therefore, for example, in the reduction step, even in the case where the number of cycles of applying the cyclic voltage to the stack 14 is small, in the measurement step, it becomes possible to measure output of the stack 14 highly accurately.

Further, since the mixed gas is supplied to the cathode 28, it is possible to reduce the quantity of hydrogen gas consumed in the power generation reaction. Therefore, it becomes possible to achieve further reduction in the cost required for output inspection of the stack 14.

Further, the output inspection method of the embodiment of the present application may further include an oxidation step of applying oxidation treatment to the electrode catalyst before the reduction step. Specifically, for example, after the stack 14 is assembled, the stack 14 is set to the output inspection apparatus 10. Thereafter, the first supply unit 40a supplies the fuel gas to the anode 26, and the second supply unit 40b supplies the oxygen-containing gas to the cathode 28. In the procedure, the voltage applied between the anode 26 and the cathode 28 becomes not less than the reduction potential of the electrode catalyst. The oxidation step is performed by maintaining this state until the electrode catalyst is oxidized.

After this oxidation step, by performing the reduction step, it is possible to suppress or eliminate variation in the oxidation reduction state of the electrode catalyst effectively to a greater extent. Therefore, in the measurement step after the reduction step, it becomes possible to perform output inspection of the stack 14 accurately to a greater extent.

EMBODIMENT EXAMPLES

Embodiment Example 1

A stack 14 was assembled by stacking ten power generation cells 12 each having an MEA 18 with an effective power generation area of 100 cm$^2$, and having electrode catalyst of platinum. Then, in order to allow the electrode catalyst contained in the anode 26 and the cathode 28 to have variation in the oxidation reduction state, the stack 14 was used for 10 hours, and then, set to the output inspection apparatus 10.
(1) Reduction Step A reduction step was performed for the above stack 14. In the reduction step, for example, the temperature of the stack 14 was regulated to 80° C. by supplying a heat transmission medium having a regulated temperature to the coolant flow field 34 provided in the stack 14. Further, by the first supply unit 40a, a hydrogen gas (fuel gas) humidified to have the dew point of 75° C. was supplied to the anode 26 at the flow rate of 0.3 NL/min, and by the second supply unit 40b, a nitrogen gas (inert gas) humidified to have the dew point of 80° C. was supplied to the cathode 28 at the flow rate of 2.4 NL/min.

Then, after it was confirmed that the average cell potential of the cathode 28 became substantially constant at around 0.10 V, the cyclic voltage which is increased and decreased in the range between 0.08 V and 1.00 V was applied to the stack 14 by the voltage application unit 42 to apply reduction treatment to the electrode catalyst. At this time, the voltage was increased from 0.08 V to 1.00 V over a period of 45 seconds. Thereafter, the voltage was decreased from 1.00 V to 0.08 V over a period of 45 seconds. One cycle is made up of these periods. An embodiment example of the stack 14 obtained by performing the reduction step where the number of cycles is 1 (one) will be referred to as the embodiment example 1-1. An embodiment example of the stack 14 obtained by performing the reduction step where the number of cycles is 2 (two) will be referred to as the embodiment example 1-2. An embodiment example of the stack 14 obtained by performing the reduction step where the number of cycles is 3 (three) will be referred to as the embodiment example 1-3. An embodiment example of the stack 14 obtained by performing the reduction step where the number of cycles is 4 (four) will be referred to as the embodiment example 1-4. An embodiment example of the stack 14 obtained by performing the reduction step where the number of cycles is 5 (five) will be referred to as the embodiment example 1-5.

(2) Measurement Step

For each of the stacks 14 of the embodiment examples 1-1 to 1-5, in the state where application of voltage by the voltage application unit 42 is stopped, the measurement step was performed. In the measurement step, the temperature of the stack 14 was regulated to 80° C. by a temperature regulating unit 44. Further, by the first supply unit 40a, a hydrogen gas humidified to have the dew point of 80° C. was supplied to the anode 26 at the flow rate of 0.3 NL/min, and by the second supply unit 40b, the air (oxygen-containing gas) humidified to have the dew point of 80° C. was supplied to the cathode 28 at the flow rate of 2.4 NL/min. In this manner, power generation reactions were induced at the anode 26 and the cathode 28. At this time, both of the anode 26 and the cathode 28 were electrically connected together by the energizing unit 41. Then, measurement current at 0.002 A/cm$^2$ which is smaller than the rated current (1.00 A/cm$^2$) was used as the energizing current. The voltage of each of the stacks 14 of the embodiment examples 1-1 to 1-5 was measured to obtain the measurement result of the output.

For each of the stacks 14 of the embodiment examples 1-1 to 1-5, (1) the reduction step and the (2) measurement step were performed in combination, repeatedly 10 times, to obtain measurement results of 10 outputs. For each of the measurement results of the 10 outputs, the ratio value relative to the average value was determined, and is shown in FIG. 2. Further, the standard deviation of the measurement results of 10 outputs and the average value of the 10 ratio values are shown in FIG. 2 as well. It should be noted that the number of times shown in FIG. 2 is the number of repeating the combination of the reduction step and the measurement step.

Comparative Example 1

In a comparative example 1, only the (2) measurement step was performed without performing the (1) reduction step. For the stack 14 of the comparative example 1, by repeating the (2) measurement step 10 times, measurement results of 10 outputs were obtained. In the same manner as in the cases of the embodiment examples 1-1 to 1-5, also in these measurement results of the 10 outputs, the ratio values relative to the average value, the standard deviation, and the average value of the ratio values were calculated, and are shown in FIG. 2 as well. Further, for ease of comparison, the standard deviation determined for each of the embodiment examples 1-1 to 1-5 and the comparative example 1 is shown in a graph of FIG. 3.

It should be noted that, in the measurement step, all of the average values of the measurement results of the outputs of the stacks 14 of the embodiment examples 1-1 to 1-5 and the comparative example 1 where the air is supplied to the cathode 28 were not less than the reduction potential of the electrode catalyst (platinum) of 0.75 V.

Embodiment Example 2

In the measurement step (2), measurement results of the outputs of the embodiment examples 2-1 to 2-5 were obtained in the same manner as in the case of the embodiment examples 1-1 to 1-5 except that the second supply unit 40b supplied a mixed gas of the air at the flow rate of 0.6 NL/min and a nitrogen gas at the flow rate of 1.8 NL/min, to the cathode 28.

Comparative Example 2

In the measurement step (2), the measurement result of the output of the comparative example 2 was obtained in the same manner as in the case of the comparative example 1 except that the second supply unit 40b supplied the same mixed gas as in the case of the embodiment example 2 to the cathode 28.

In the same manner as the embodiment examples 1-1 to 1-5 and the comparative example 1, also in the measurement results of the outputs of the embodiment examples 2-1 to 2-5 and the comparative example 2, the ratio values relative to the average value, the standard deviation, and the average value of the ratio values were determined, and are shown in FIG. 4 as well. Further, for ease of comparison, the standard deviation determined for each of the embodiment examples 2-1 to 2-5 and the comparative example 2 is shown in a graph of FIG. 5.

It should be noted that, in the measurement step, all of the average values of the measurement results of the outputs of the stacks 14 of the embodiment examples 2-1 to 2-5 and the comparative example 2 where the mixed gas is supplied to the cathode 28 were less than the reduction potential of the electrode catalyst (platinum) of 0.75 V.

As shown in FIGS. 2 to 5, in the embodiment examples 1-1 to 1-5, and 2-1 to 2-5 where the reduction step was performed, in comparison with the comparative examples 1 and 2 where no reduction step was performed, it is possible to reduce the standard deviation. Therefore, by performing the measurement step after variation in the oxidation reduction state of the electrode catalyst has been suppressed or eliminated through the reduction step, even if the energizing current applied between the anode 26 and the cathode 28 is smaller than the rated current in the measurement step, it is possible to suppress variation in the measurement results of the output. Accordingly, it is possible to obtain the measurement results of the output highly accurately, and it is not required to provide an apparatus in large scale or large quantities of the fuel gas, etc. for applying large energizing current which is as large as the rated current, to the anode 26 and the cathode 28. For this reason, with the simple structure, it is possible to perform output inspection of the stack 14 at low cost.

Figure 3:
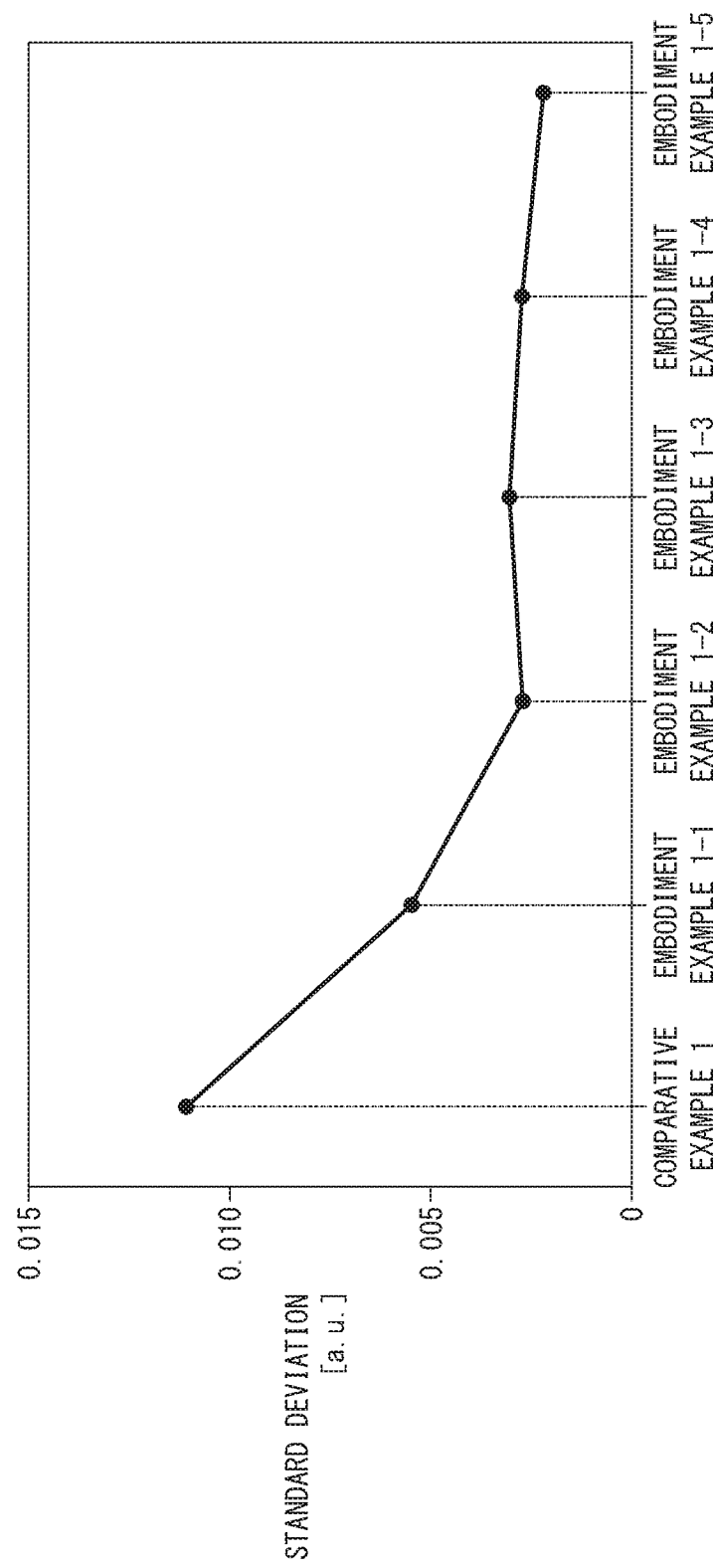
FIG. 3 is a graph showing the standard deviation in each of the embodiment examples 1-1 to 1-5 and the comparative example 1.

Further, the following points were found from FIGS. 2 and 3 in the embodiment examples 1-1 to 1-5. In the reduction step, in the case where the number of the cycles is 1 (embodiment example 1-1), it is possible to sufficiently reduce the standard deviation in comparison with the comparative example 1. Further, in the case where the number of cycles is 2 or more (embodiment examples 1-2 to 1-5), it is possible to reduce the standard deviation more effectively. Therefore, in the case of obtaining the measurement results of the output in the measurement step which is not less than the reduction potential of the electrode catalyst, when the number of cycles in the reduction step is 2 or more, it becomes possible to measure the output of the stack 14 with a higher degree of accuracy.

Figure 5:
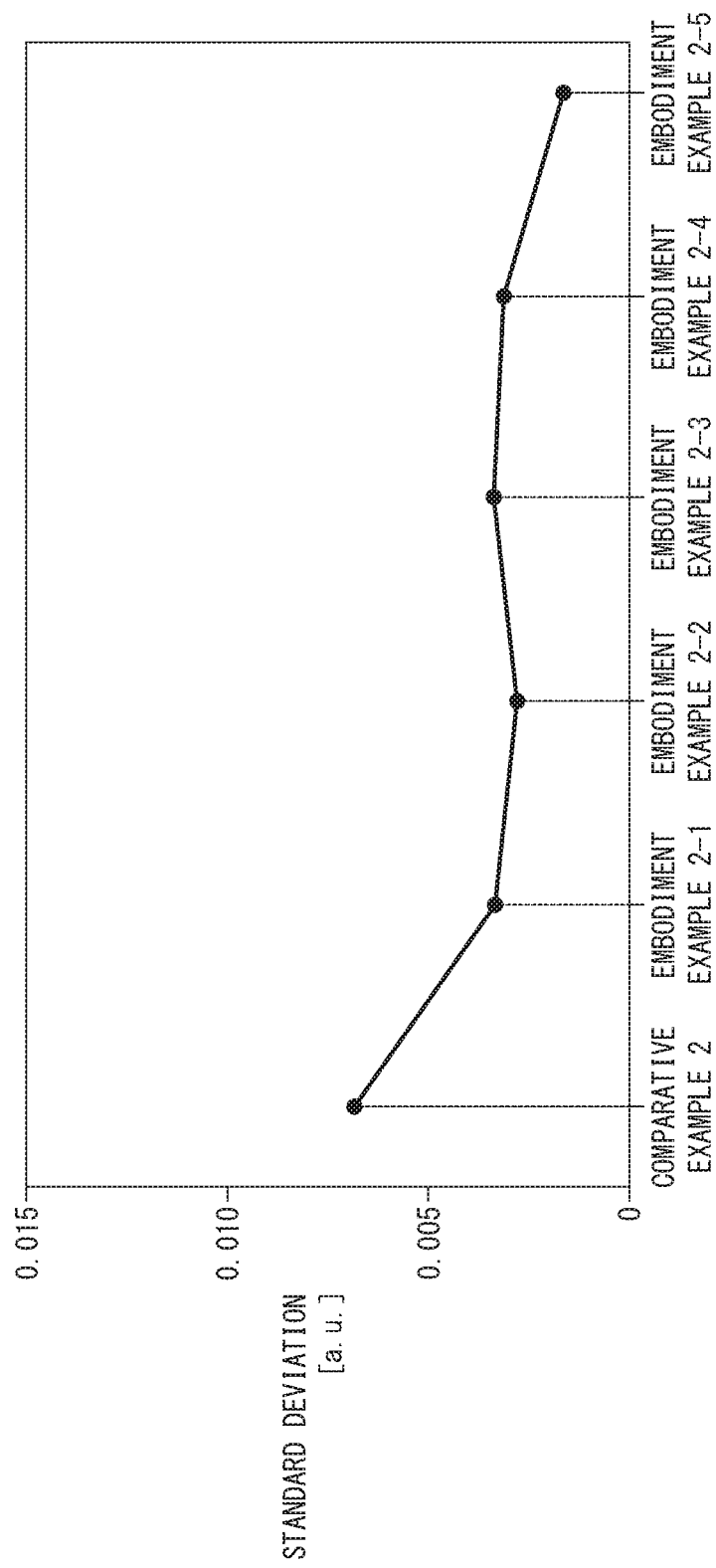
FIG. 5 is a graph showing the standard deviation in each of the embodiment examples 2-1 to 2-5 and the comparative example 2.

On the other hand, it was found from FIGS. 4 and 5 that, in the embodiment examples 2-1 to 2-5, in the reduction step, in the case where the number of cycles is 1 (embodiment example 2-1), it is possible to sufficiently reduce the standard deviation in comparison with the comparative example 2. Therefore, in the case where the measurement results of the output obtained in the measurement step are less than the reduction potential of the electrode catalyst, even in the case where the number of cycles in the reduction step is 1, it is possible to measure the output of the stack 14 highly accurately.

That is, in the case where the measurement results of the output are less than the reduction potential of the electrode catalyst, since it is possible to suppress oxidation of the electrode catalyst at the time of performing the measurement step, it is possible to suppress influence of variation in the oxidation reduction state of the electrode catalyst on the measurement results of the output effectively to a greater extent. As a result, for example, in comparison with the case where the measurement results of the output are not less than the reduction potential of the electrode catalyst, even in the case where the number of cycles in the reduction step is reduced, it becomes possible to measure the output of the stack 14 highly accurately.

It was found from FIGS. 4 and 5 that, even in the case where the measurement results of the output of the electrode catalyst are less than the reduction potential of the electrode catalyst, by setting the number of cycles in the reduction step to be 2 or more (embodiment examples 2-2 to 2-5), it may be possible to reduce the standard deviation.

Further, in the embodiment examples 2-1 to 2-5, since the mixed gas is supplied to the cathode 28, it is possible to reduce the quantity of the hydrogen gas consumed in the power generation reaction. Also in this respect, it becomes possible to reduce the cost required for output inspection of the stack 14.

Embodiment Example 3

The measurement results of the outputs of the embodiment examples 3-1 to 3-3 were obtained, respectively, by performing the (1) reduction step and the (2) measurement step in the same manner as in the case of the embodiment example 1-2, except that range of the cyclic voltage applied by the voltage application unit 42 to the stack 14 in the (1) reduction step was changed.

Specifically, in the embodiment example 3-1, the cyclic voltage was in the range between 0.08 V and 0.50 V, and the number of cycles was 2. Further, in the embodiment example 3-2, the cyclic voltage was in the range between 0.50 V and 1.00 V, and the number of cycles was 2. That is, in the embodiment examples 3-1, 3-2, the minimum value of the cyclic voltage was less than the reduction potential of the electrode catalyst.

In the embodiment example 3-3, the cyclic voltage was in the range between 0.85 V and 1.00 V, and the number of cycles was 2. Therefore, the minimum value of the cyclic voltage was not less than the reduction potential of the electrode catalyst.

Figure 7:
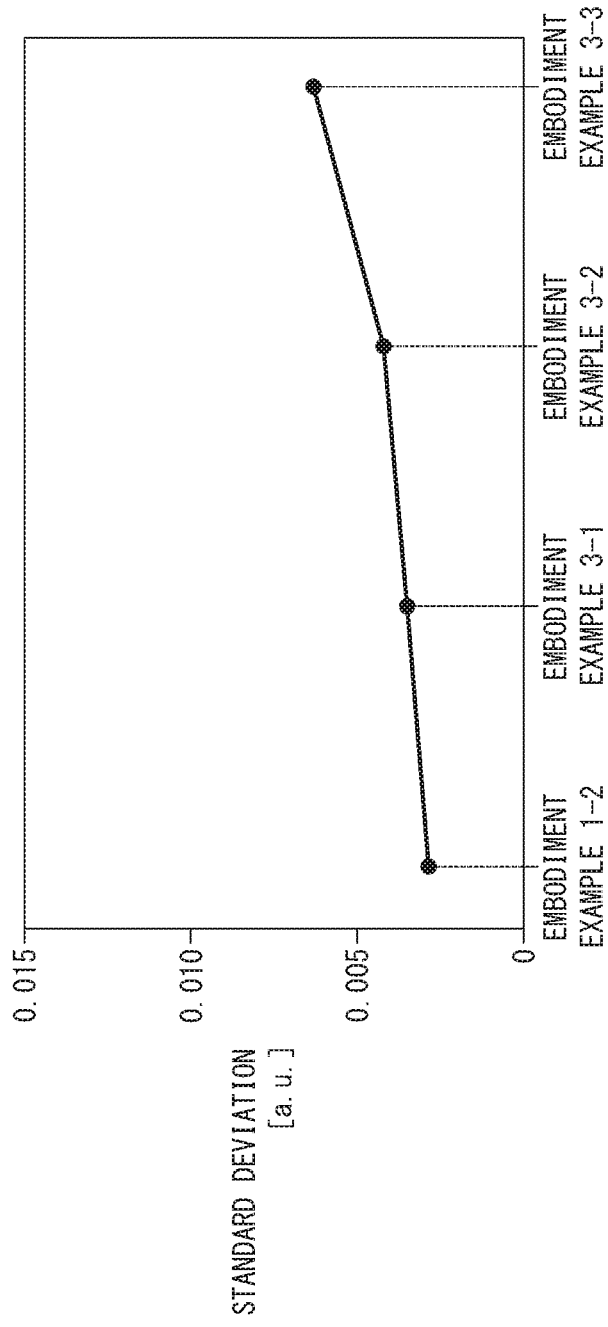
FIG. 7 is a graph showing the standard deviation in each of the embodiment examples 1-2 and 3-1 to 3-3.

Also in the measurement results of the outputs of the embodiment examples 3-1 to 3-3, in the same manner as described above, the ratio values relative to the average value, the standard deviation, and the average value of the ratio values were determined, and are shown in FIG. 6. For comparison, the ratio values relative to the average value, the standard deviation, and the average value of the ratio values in the embodiment example 1-2 and the comparative example 1 are shown in FIG. 6 as well. Further, the standard deviations determined for the embodiment examples 1-2 and 3-1 to 3-3 are shown in a graph of FIG. 7.

Embodiment Example 4

Also in the embodiment example 2-2, in the same manner as in the cases of the embodiment examples 3-1 to 3-3, in the (1) reduction step, the range of the cyclic voltage applied to the stack 14 by the voltage application unit 42 was changed to obtain measurement results of the outputs of embodiment examples 4-1 to 4-3.

Figure 9:
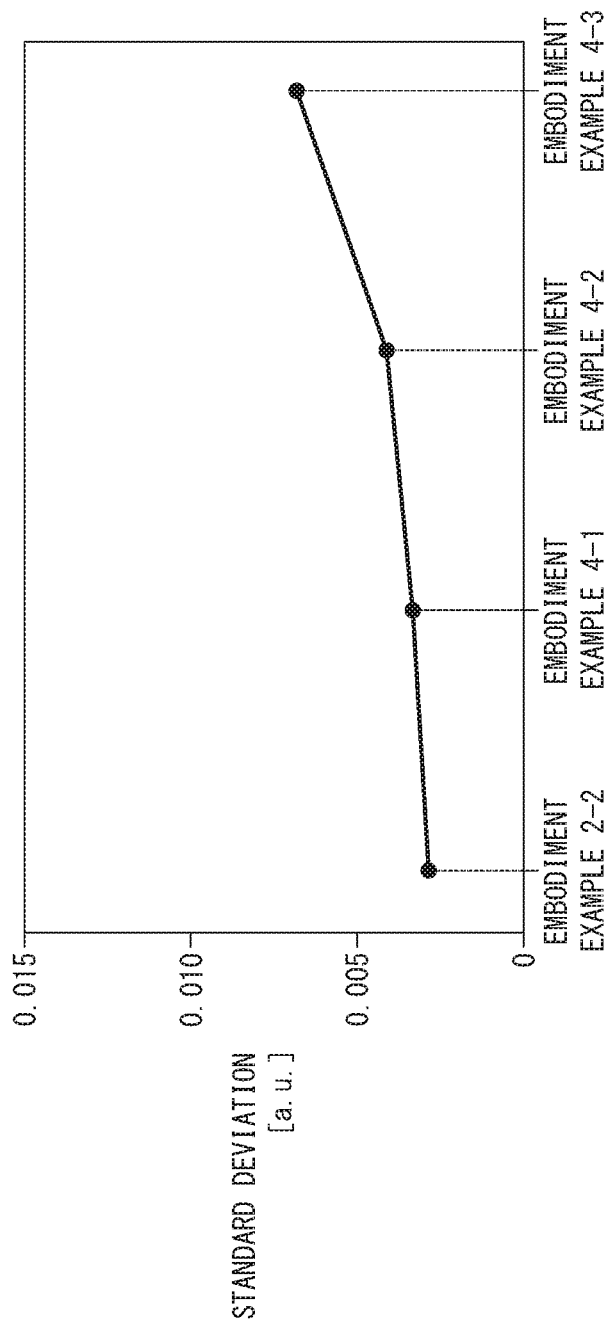
FIG. 9 is a graph showing the standard deviation in each of the embodiment examples 2-2, 4-1 to 4-3.

In the same manner as described above, also in the measurement results of the outputs of the embodiment examples 4-1 to 4-3, the ratio values relative to the average value, the standard deviation, and the average value of the ratio values were determined, and are shown in FIG. 8. Further, for ease of comparison, the ratio values relative to the average value, the standard deviation, and the average value of the ratio values for each of the embodiment examples 2-2 and the comparative example 2 are shown in a graph of FIG. 8 as well. Further, the standard deviation determined for each of the embodiment examples 2-2, 4-1 to 4-3 is shown in a graph of FIG. 9.

As can be seen from FIGS. 6 to 9, it was found that, in the embodiment examples 1-2, 2-2, 3-1 to 3-3, and 4-1 to 4-3 where the reduction step was performed, in comparison with the comparative examples 1, 2 where no reduction step was performed, it becomes possible to reduce the standard deviation.

Further, as can be seen from FIGS. 6 to 9, in comparison with the comparison examples 3-3, 4-3 where the minimum value of the cyclic voltage is not less than the reduction potential of the electrode catalyst, in the embodiment examples 1-2, 2-2, 3-1, 3-2, 4-1, and 4-2 where the minimum value of the cyclic voltage is less than the reduction potential of the electrode catalyst, it is possible to reduce the standard deviation.

Further, it was found that, in the embodiment examples 1-2, 2-2 where the minimum value of the cyclic voltage is less than the reduction potential of the electrode catalyst and the maximum value of the cyclic voltage is not less than the reduction potential of the electrode catalyst, in comparison with the embodiment examples 3-1, 4-1 where both of the minimum value and the maximum value of the cyclic voltage are less than the reduction potential of the electrode catalyst, it is possible to reduce the standard deviation.

In view of the above, even if the cyclic voltage falls within the above range, by performing the reduction step, it is possible to suppress variation of the measurement results of the outputs in comparison with the comparative examples 1, 2 where no reduction step was performed. That is, it becomes possible to measure the output the stack 14 highly accurately.

Further, in the reduction step, by setting the minimum value of the cyclic voltage to be less than the reduction potential of the electrode catalyst, it is possible to effectively reduce the electrode catalyst. Consequently, since it becomes possible to perform the measurement step after variation of the oxidation reduction state has been suppressed or eliminated effectively, it becomes possible to measure the output of the stack 14 with a higher degree of accuracy.

Further, in the reduction step, by setting the minimum value of the cyclic voltage to be less than the reduction potential of the electrode catalyst, and setting the maximum value of the cyclic voltage to be not less than the reduction potential of the electrode catalyst, it is possible to reduce the electrode catalyst effectively to a greater extent. Consequently, it becomes possible to achieve further improvement in the accuracy of measuring the output.

Embodiment Example 5

The measurement result of the output of an embodiment example 5 was obtained in the same manner as in the case of the embodiment example 1-2 except that the oxidation step was performed before performing the (1) reduction step. Specifically, in the oxidation step, the temperature of the stack 14 set to the output inspection apparatus 10, before performing the reduction step was regulated to 80° C. Further, by the first supply unit 40a, a hydrogen gas humidified to have the dew point of 75° C. was supplied to the anode 26 at the flow rate of 0.3 NL/min, and by the second supply unit 40b, the air humidified to have the dew point of 80° C. was supplied to the cathode 28 at the flow rate of 2.4 NL/min.

Then, after it was confirmed that the average cell potential of the cathode 28 became substantially constant at around 1.00 V, this state was kept for 5 minutes. That is, the oxidation step was performed by maintaining the state where the voltage applied between the anode 26 and the cathode 28 is not less than the reduction potential of the electrode catalyst, until the electrode catalyst is oxidized. Thereafter, in the same manner as in the case of the embodiment examples 1-2, the (1) reduction step and the (2) measurement step were performed to obtain the measurement results of the output of the stack 14. For measurement results of 10 outputs of the stack 14 of the embodiment example 5 obtained by repeating the oxidation step, the reduction step, and the measurement step 10 times, in the same manner as described above, the ratio values relative to the average value, the standard deviation, and the average value of the ratio values were determined, and are shown in FIG. 10. For comparison, the ratio values relative to the average value, the standard deviation, and the average value of the ratio values in the embodiment example 1-2 are shown in FIG. 10 as well.

As shown in FIG. 10, in the embodiment example 5 where the oxidation step was performed, in comparison with the embodiment example 1-2 where no oxidation step was performed, it is possible to reduce the standard deviation to a greater extent. Therefore, by performing the reduction step after the oxidation step, it is possible to perform the measurement step after variation in the oxidation reduction state of the electrode catalyst has been suppressed or eliminated effectively. Consequently, it becomes possible to perform output inspection of the stack 14 with a higher degree of accuracy.

What is claimed is:

1. A method of inspecting a voltage output of a fuel cell, the fuel cell comprising an electrolyte membrane of solid polymer, an anode provided on one surface of the electrolyte membrane, and a cathode provided on another surface of the electrolyte membrane, the method comprising:
a reduction step of applying reduction treatment to electrode catalyst contained in the anode and the cathode; and
a measurement step of measuring the voltage output of the fuel cell after the reduction treatment is applied to the electrode catalyst, by applying measurement current which is smaller than rated current of the fuel cell, to the anode and the cathode;
wherein in the reduction step, while a fuel gas is supplied to the anode and an inert gas is supplied to the cathode, cyclic voltage is applied to the fuel cell, the cyclic voltage being increased and decreased within a predetermined range having a minimum voltage less than a reduction potential of the electrode catalyst.

2. The method of inspecting the voltage output of the fuel cell according to claim 1, further comprising an oxidation step of applying oxidation treatment to the electrode catalyst before the reduction step.

3. The method of inspecting the voltage output of the fuel cell according to claim 2, wherein, in the oxidation step, a fuel gas is supplied to the anode and an oxygen-containing gas is supplied to the cathode to regulate the voltage applied between the anode and the cathode to be not less than a reduction potential of the electrode catalyst.

* * * * *